April 14, 1970

O. CONRAD 3,506,372

GAS TURBINES FOR THE DRIVE OF VEHICLES

Filed March 7, 1968

INVENTOR
OSWALD CONRAD

BY Craig & Antonelli

ATTORNEYS

April 14, 1970      O. CONRAD      3,506,372

GAS TURBINES FOR THE DRIVE OF VEHICLES

Filed March 7, 1968      2 Sheets-Sheet 2

United States Patent Office 3,506,372
Patented Apr. 14, 1970

3,506,372
GAS TURBINES FOR THE DRIVE OF VEHICLES
Oswald Conrad, Schmiden, Wurttemberg, Germany, assignor to Daimler-Benz Aktiengesellschaft, Stuttgart-Unterturkheim, Germany
Filed Mar. 7, 1968, Ser. No. 711,441
Claims priority, application Germany, Mar. 9, 1967, D 52,482
Int. Cl. F01d *1/00, 3/00;* F02c *7/26*
U.S. Cl. 415—61         11 Claims

ABSTRACT OF THE DISCLOSURE

A gas turbine for driving vehicles which includes two coaxially arranged rotors, one of the two rotors constituting a starting rotor having a high stationary moment and being connected with the turbine shaft by a one-way device while the other rotor forms an operating rotor having a low stationary torque and being securely connected with the turbine shaft; the outlet sides of the two rotors terminate in a common annular discharge space arranged centrally while the inlet sides thereof are connected with inlet spirals that are adapted to be selectively connected with a common inlet channel which, in turn, is adapted to be connected with a gas producer.

BACKGROUND OF THE INVENTION

The present invention relates to a gas turbine for driving vehicles, and more particularly, to gas turbines, suitable for driving motor vehicles.

The vehicle gas turbine is superior to the vehicle piston engine by its high stationary moment. The stationary moment of the gas turbine amounts to about 2.5 times its moment at rated rotational speed whereas that of the piston engine is zero. For passenger motor vehicles, a stationary moment of about five times the value of the rated moment is needed. Hence, both piston engine as well as the gas turbine require a change-speed gear so that the moment characteristics of the gas turbine which are relatively favorable compared to those of the piston engine, entails no essential advantages.

It has already been attempted to increase the stationary moment of the turbine by two coaxially arranged rotors and thus to dispense with the change-speed gear. In this prior art construction, the output torque produced in a stationary rotor imparts thereby to the following second rotor an opposite moment which is transmitted to the drive shaft by way of a planetary gear and an over-running clutch. Below approximately half the rated rotational speed, both rotors have opposite directions of rotation and both are effective whereas above half the rated rotational speed, only the first rotor is effective while the second rotor idles along in the same direction of rotation. Stationary moment characteristics of 5-6 are achieved in this prior art arrangement. However, the disadvantage of such prior art arrangement is the necessity of a reversing gear. A further disadvantage thereof is the disturbance of the flow by the rotor idling along at the higher rotational speeds, i.e., exactly when a higher efficiency is desired.

SUMMARY OF THE INVENTION

It is the aim of the present invention to produce a turbine with two coaxially arranged rotors which avoids these disadvantages. This is achieved according to the present invention in that a starting rotor with high stationary moment is connected with the turbine shaft by way of a free-wheeling device and an operating rotor having a low stationary moment is securely connected with this turbine shaft whereby the outlet or discharge sides of both rotors terminate in a centrally arranged common annular discharge space whereas the inlet sides of the rotors are connected each with a respective inlet spiral that is adapted to be connected selectively with the common inlet channel.

A particularly simple guidance of the gas stream is achieved according to the present invention in that a flap or damper is pivotally supported in a branch piece between the inlet channel and the two inlet spirals which flap closes in its two end positions a respective one of the two branch lines to the inlet spirals.

According to a further feature and development of the present invention, a rotational speed transmitter displaces, when either exceeding or falling below the shifting rotational speed, the flap into the posititon either closing or opening the branch line to the starting rotor by means of a servo-shifting device and an adjusting motor.

A favorable torque characteristic results according to the present invention in that the shifting rotational speed amounts to 40 to 60% of the rated rotational speed of the operating rotor and in that the starting rotor and the operaing rotor produce the same torque at the shifting rotational speed.

Accordingly, it is an object of the present invention to provide a gas turbine for driving vehicles which obviates by simple means the aforementioned shortcomings and drawbacks encountered in the prior art.

Another object of the present invention resides in a gas-turbine for driving vehicles which produces favorable moment characteristics and in particular a high stationary moment without the need of expensive and complicated mechanical devices.

Still a further object of the present invention resides in a gas turbine for driving passenger motor vehicles which obviates the need of change-speed gears or reversing gears and which minimizes the disturbance of the flow of the gas streams.

Another object of the present invention resides in a gas turbine of the type described above which permits the attainment of high efficiency, particularly under normal operating conditions.

Still a further object of the present invention resides in a gas turbine for driving a vehicle which produces a particularly favorable guidance of the gas stream.

These and other objects, features and advantages of the present invention will become more obvious from the following description when taken in connection with the accompanying drawing which shows, for purposes of illustration only, one embodiment in accordance with the present invention, and wherein.

Figure 1:
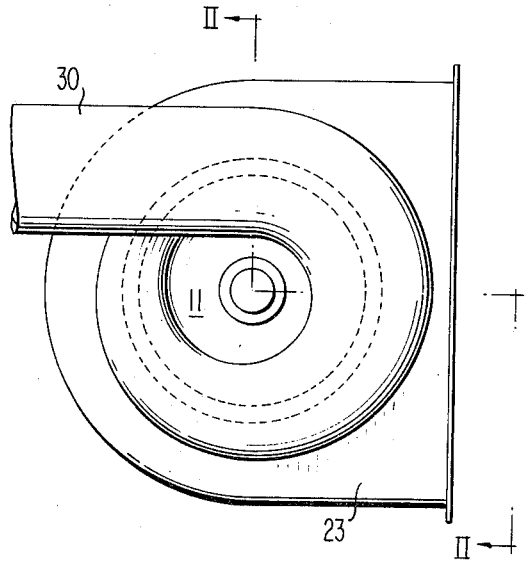
FIGURE 1 is a side elevational view of an axial gas turbine in accordance with the present invention.
Figure 2:
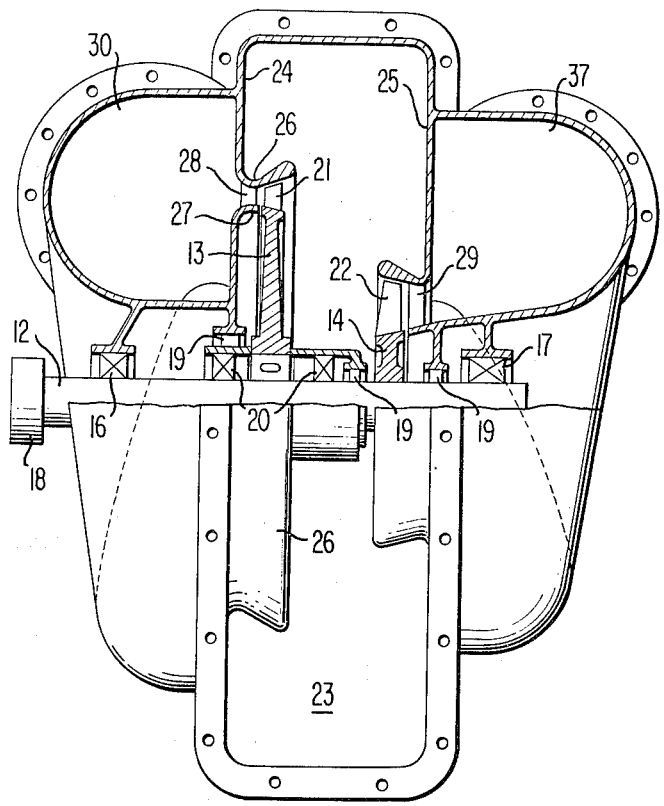
FIGURE 2 is a cross-sectional view taken along line II—II of FIGURE 1.

Referring now to the drawing wherein like reference numerals are used throughout the various views to designate corresponding parts, two rotors, and more particularly a starting rotor 13 and an operating rotor 14 are arranged within a turbine housing 11 (FIG. 1) on a shaft 12 (FIG. 2). An intermediate piece 15 (FIG. 3) establishes the connection between the housing 11 and a conventional gas producer (not shown).

The turbine shaft 12 is supported within the housing 11 by means of roller bearings 16 and 17. A flange 18 at the turbine shaft 12 serves for the transmission of torque to a simple speed-reduction gear. Labyrinth seals 19 seal the housing 11 with respect to the shaft 12. The starting rotor 13 is operatively connected with the shaft 12 by way of a gripping roller free-wheeling device 20 of conventional construction whereas the operating rotor 14 is securely mounted on the shaft 12 to rotate in unison therewith. The rotors 13 and 14 are so designated and dimensioned in a conventional manner that the starting rotor 13 has a high stationary moment whereas the operating rotor 14 has a lower stationary moment. The starting rotor 13 has correspondingly a larger average diameter than the operating rotor 14. Furthermore, both the size and cross-section of the blades 21 of the starting rotor 13 differ from the blades 22 of the operating rotor 14 as is well known in the art to achieve the intended purposes.

The outlet sides of the rotors 13 and 14 terminate in a common central annular discharge space 23. The two end faces 24 and 25 of the annular discharge space 23 pass over into two coaxial guide rings 26 and 27 between which are arranged the guide blades 28 and 29. The outer guide rings 26 and 27 are extended to such an extent that they serve as casing for the rotors 13 and 14. Inlet spirals 30 and 31 for the rotors 13 and 14 adjoin on both sides the annular discharge space 23, respectively.

Figure 3:
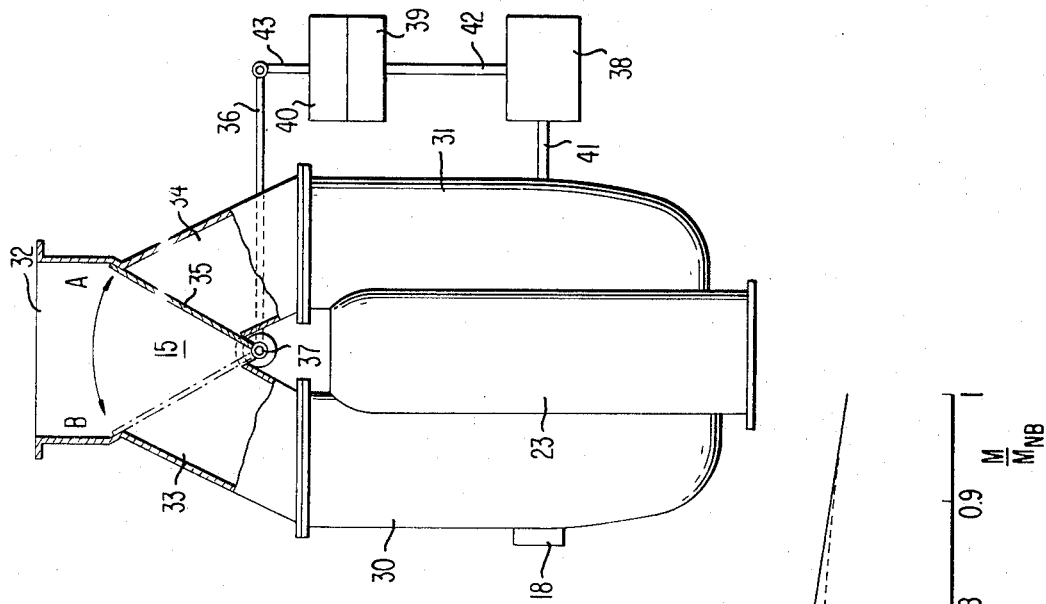
FIGURE 3 is a plan view, partly in cross section, through the gas turbine of the present invention with an attached intermediate piece.

The intermediate piece 15 illustrated in FIGURE 3 consists of the inlet channel 32 which passes into the two branch lines 33 and 34 leading to the inlet spirals 30 and 31, respectively. A flap 35 is supported in the intermediate piece 15 which can be pivoted about its axis 37 by means of a lever 36 into two end positions A and B in which a respective one of the branch lines 33 and 34 is opened and the other one is closed.

A rotational speed transmitter 38, a servo-shifting device 39 and an adjusting motor 40 are merely illustrated schematically in the drawing since they are of conventional construction and form no part of the present invention. For example, a centrifugal governor may be used as rotational speed transmitter, whereas a hydraulic control slide valve with servo follow-up piston may be used as servo shifting device and adjusting motor. The rotational speed transmitter 38 is connected by way of a shaft 41 with a turbine shaft 12 and by way of a rod 42 with the servo-shifting device 39. A further rod 33 connects the adjusting motor 40 with the lever 36 for the adjustment of the flap 35.

In FIGURE 3, the flap 35 is in the end position A in which the gas stream is conducted through the inlet channel 32, the branch line 33, the inlet spiral 30, and the guide vanes 28. The gas stream acts upon the blades 21 of the starting rotor 13 and sets the same into rotation. The clamping roller free-wheeling device 20 is in the locking position so that the turbine shaft 12 is rotated along. Upon exceeding a predetermined rotational speed, the rotational speed transmitter 38 adjusts by way of the rod 42 the servo-shifting device 39. The adjusting motor 40 influenced by the servo-shifting device 39 displaces the rod 43 and therewith pivots the lever 36 together with the flap 35 about the axis 37 thereof into the other end position B, in which the branch line 33 is closed and the branch line 34 is opened. As a result thereof, the gas stream conducted through the inlet spiral 31 and through the guide blades 29 acts upon the blades 22 of the operating rotor 14 which is thus accelerated. The operating rotor 14 and the turbine shaft 12 securely connected therewith overtake the starting rotor 13, no longer acted upon, whose clamping roller free-wheeling device 20 now releases and therewith disengages the rotatable connection with the turbine shaft 12. The starting rotor 13 which is no longer traversed by the gas stream now comes to a standstill or idles along.

The starting rotor 13 not only serves to facilitate the starting of the vehicle, but it also has the task to drive the vehicle under all other driving conditions in which with lower driving velocities a higher torque is desired, for example, with slower city drives or on inclines. The gas stream is conducted as described hereinabove to the starting rotor 13 when falling below the shifting rotational speed.

Figure 4:
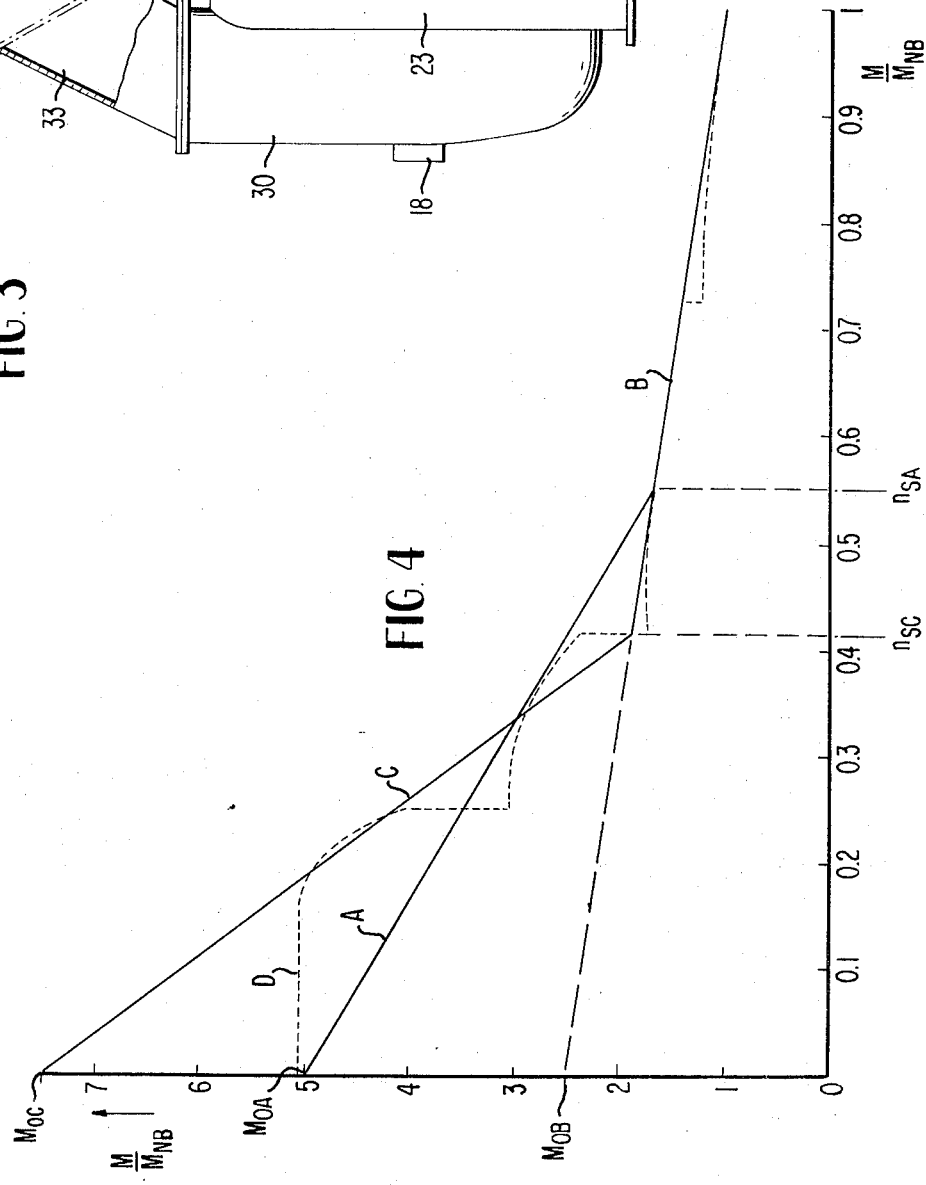
FIGURE 4 is a torque-rotational speed diagram of the turbine in accordance with the present invention.

The cooperation of the starting rotor 13 and of the operating rotor 14 is illustrated in FIGURE 4 in a dimensionless torque-rotational speed diagram. The ratio of rotational speed $n$ of the turbine shaft 12 to the rated rotational speed $n_{NB}$ of the operating rotor 14 is plotted along the abscissa while the ratio of the torque M of the turbine shaft 12 to the rated torque $M_{NB}$ of the operating rotor is plotted along the ordinate. The line A designates the torque curve of the starting rotor 13 and the line B that of the operating rotor 14. As a further example, the line C illustrates the torque curve of a starting rotor which has a larger diameter compared to the starting rotor 13 shown in the drawing. For purposes of comparison, the torque curve D of a conventional, four-speed transmission of a piston-type internal combustion engine is additionally shown in the drawing. Reference character $M_{OA}$ is the stationary moment of the starting rotor 13, $M_{OB}$ the stationary moment of the operating rotor 14 and $n_{SA}$ is the shifting rotational speed which in the illustrated embodiment lies at 55% of the rated rotational speed of the operating rotor 14. If $D_A$ is the diameter of the starting rotor 13 and $D_B$ that of the operating rotor 14, then with the same deflection conditions in both rotors, the starting moment $M_{OA}$ of the starting rotor 13 is about $D_A/D_B$ times that of the stationary moment of the operating rotor 14. In the illustrated embodiment, with a ratio of the stationary moment $M_O$ to the rated moment $M_N$ of the two rotors of $M_O/M_N=2.5$ and with a diameter ratio of $D_A/D_B=2$, there results with a rotational speed reduction from the rated rotational speed to the standstill of the turbine a torque increase by a factor of 5. A starting rotor with a torque curve according to line C, whose diameter ratio to the operating rotor amounts to about 3:1, produces thereby a torque increase at standstill in excess of 7 times. For this rotor the stationary moment is designated in the diagram with $M_{OC}$ and the shifting rotational speed with $n_{SC}$. A comparison of these values with the torque conversion according to line D of a four-speed transmission driven by a piston internal combustion engine, illustrates that the gas turbine according to the present invention renders superfluous a change-speed transmission since the torque conversion thereof at least reaches or even considerably surpasses that of a four-speed transmission.

If one seeks to avoid excessive diameter differences of the two rotors of the turbine, then this can be achieved in that one arranges a simple speed-reduction gear, for example, a planetary gear between the starting rotor and the gripping-roller free-wheeling device. One can also achieve thereby the same torque conversion with a smaller diameter of the starting rotor.

While I have shown and described only one embodiment in accordance with the present invention, it is understood that the same is not limited thereto, but is susceptible of numerous changes and modifications as known to a person skilled in the art. For example, in lieu of the illustrated axial rotors, it is also possible to utilize radial rotors. Nothing changes in the basic construction and cooperation of the two rotors. Thus, it is obvious that the present invention is susceptible of numerous changes and modifications, and I therefore do not wish to be limited to the details shown and described herein but intend to cover all such changes and modifications as are encompassed by the scope of the present invention.

I claim:

1. A gas turbine for the drive of vehicles, comprising two coaxially arranged rotor means, a turbine shaft, one of said rotor means having a high stationary moment and being operatively connected by way of a free-wheeling means with said turbine shaft, and the other rotor means, which forms the operating rotor and has a lower stationary moment, being securely connected with said turbine shaft, said two rotor means being adapted to rotate about said turbine shaft in the same rotational direction, said rotor means each having an inlet side and an outlet side, the outlet sides of the two rotor means terminating in a centrally arranged common annular discharge space, inlet spiral means connected with a respective one of the inlet sides of the rotor means, and selectively operable means for connecting a respective inlet spiral means with a common inlet channel so as to close one inlet side while opening the other inlet side and vice versa.

2. A gas turbine according to claim 1, further comprising branching conduit means between the inlet channel and the two inlet spiral means, said selectively operable means including flap means pivotally supported in said branching conduit means, said flap means being operable to close in a respective one of its two end positions a corresponding one of the branch lines leading to the inlet spiral means.

3. A gas turbine according to claim 2, further comprising rotational speed-transmitter means, adjusting motor means operatively connected with the flap means of the selectively operable means, and means for selectively closing one of the inlet spiral means while opening the other inlet spiral means and vice versa when exceeding and dropping below the shifting rotational speed of the turbine.

4. A gas turbine according to claim 3, wherein the shifting rotational speed amounts to about 40 to 60% of the rated rotational speed of the operating rotor means, and said operating rotor means and said starting rotor means producing about the same torque at the shifting rotational speed.

5. A gas turbine for the drive of vehicles, comprising two coaxially arranged rotor means, a turbine shaft, one of said rotor means having a high stationary moment and being operatively connected by way of a free-wheeling means with said turbine shaft, and the other rotor means, which forms the operating rotor and has a lower stationary moment, being securely connected with said turbine shaft, said two rotor means being adapted to rotate about said turbine shaft in the same rotational direction, said rotors each having an inlet side and an outlet side, inlet means connected with a respective one of the inlet sides of the rotor means, and selectively operable means for connecting a respective inlet means with a common inlet channel, wherein said selectively operable means includes valve means operable to close one of the inlet means while opening the other inlet means and vice versa.

6. A gas turbine according to claim 5, further comprising means operatively connected with the valve means of the selectively operable means to control the same in dependence on the rotational speed of the turbine shaft.

7. A gas turbine according to claim 6, wherein the shifting rotational speed for said selectively operable means amounts to about 40 to 60% of the rated rotational speed of the operating rotor means.

8. A gas turbine according to claim 7, wherein said operating rotor means and said starting rotor means produce about the same torque at the shifting rotational speed.

9. A gas turbine according to claim 5, further comprising means operatively connected with the selectively operable means to control the same in dependence on the rotational speed of the turbine shaft.

10. A gas turbine according to claim 5, wherein the shifting rotational speed for said selectively operable means amounts to about 40 to 60% of the rated rotational speed of the operating rotor means.

11. A gas turbine according to claim 10, wherein said operating rotor means and said starting rotor means produce about the same torque at the shifting rotational speed.

References Cited

UNITED STATES PATENTS

| 1,128,132 | 2/1915 | Grun | 253—68 |
| 2,529,773 | 11/1950 | Johansson | 253—70 |
| 3,003,313 | 10/1961 | Bunger | 60—39.14 |
| 3,073,114 | 1/1963 | Wood | 60—39.14 |
| 3,145,532 | 8/1964 | Moss | 60—39.14 |
| 3,290,963 | 12/1966 | Oldfield et al. | 60—39.14 X |

FOREIGN PATENTS

| 793,978 | 4/1958 | Great Britain. |
| 836,836 | 6/1960 | Great Britain. |

EVERETTE A. POWELL, Primary Examiner

U.S. Cl. X.R.

60—39.14